United States Patent [19]
Lyon

[11] Patent Number: 5,342,520
[45] Date of Patent: Aug. 30, 1994

[54] FILTER FOR A ROCKDRILL

[75] Inventor: Leland H. Lyon, Roanoke, Va.

[73] Assignee: Ingersoll-Rand Company, Woodcliff Lake, N.J.

[21] Appl. No.: 902,222

[22] Filed: Jun. 22, 1992

[30] Foreign Application Priority Data

Apr. 29, 1992 [ZA] South Africa ............ 93/3130

[51] Int. Cl.⁵ ............................................. B01D 35/02
[52] U.S. Cl. ...................... 210/251; 175/315; 210/411; 210/422; 210/426
[58] Field of Search ............... 210/411, 422, 426, 251, 210/238; 175/315, 337

[56] References Cited

U.S. PATENT DOCUMENTS

| 603,834 | 5/1898 | Sprague | 210/426 |
|---|---|---|---|
| 1,438,983 | 12/1922 | Collin | 210/426 |
| 4,869,817 | 9/1989 | Mendoza et al. | 210/426 |
| 5,020,610 | 6/1991 | Lyon et al. | 210/234 |

FOREIGN PATENT DOCUMENTS

| 77/0650 | 11/1977 | South Africa . |
|---|---|---|
| 78/1058 | 8/1979 | South Africa . |
| 80/0769 | 12/1980 | South Africa . |
| 81/3310 | 4/1982 | South Africa . |
| 84/2774 | 10/1984 | South Africa . |
| 84/3407 | 10/1984 | South Africa . |
| 85/4478 | 12/1985 | South Africa . |
| 86/2411 | 9/1986 | South Africa . |
| 86/2452 | 9/1986 | South Africa . |
| 86/4760 | 6/1987 | South Africa . |
| 87/2010 | 9/1987 | South Africa . |
| 88/0161 | 8/1988 | South Africa . |
| 88/0985 | 8/1988 | South Africa . |
| 88/5402 | 1/1989 | South Africa . |
| 88/4884 | 2/1989 | South Africa . |
| 88/6019 | 3/1989 | South Africa . |
| 90/1207 | 9/1990 | South Africa . |
| 90/4164 | 1/1991 | South Africa . |
| 90/5881 | 5/1991 | South Africa . |

*Primary Examiner*—Ivars Cintins
*Attorney, Agent, or Firm*—John J. Selko

[57] ABSTRACT

A filter having a filter element is provided for a rockdrill. The filter can be operated in three modes, namely, filtering or drilling, rinsing and back-flushing. As the filter element becomes clogged a handle on the filter can be turned to a back-flushing mode position whereby the flow of fluid through the filter element is reversed and the flow of fluid thereby expels dirt and debris accumulated in and on the filter element to the atmosphere through the a outlet port. When the handle is turned back to a filtering mode position ports in a support shaft in the filter pass through the rinsing mode which washes dirt that may have accumulated on the filter element during the back-flushing mode and expels it to the atmosphere through the vent outlet port. When the handle is positioned in the filtering mode position the filter element is clean.

10 Claims, 2 Drawing Sheets

FILTER FOR A ROCKDRILL

BACKGROUND OF THE INVENTION

This invention relates generally to rockdrills. More particularly the invention relates to a filter for a rockdrill operable by a fluid under pressure for filtering the fluid to remove solid contaminants therefrom.

In deep mining operations such as in gold mines and platinum mines, a powering and cooling system is used which is referred to as hydropower. Hydropower serves the cooling and powering needs of deep underground mines by using open-loop circulation of chilled water. Water which accumulates in the sump of the mine is pumped to the surface, filtered, cooled and directed into a high-pressure vertical column which conducts the water underground. When tapped from the piping underground the high pressure water is used to cool, to generate electricity and to power various machines such as rockdrills. Because rockdrills typically have small operating clearances they are sensitive to contamination by dirty water from the hydropower system. Additionally, because the hydropower flow is on an open loop the water is filtered only on the surface before it enters the delivery and distribution piping. Various types of rockdrill inlet filters are known in hydropower systems, but due to size constraints, fluctuating levels of dirt, and resistance from operators to change filters, many of them have disadvantages. These known filters include the following:

i. Inexpensive disposable filters that are intended to be changed at the end of every drilling shift. These filters either clog too quickly, sometimes in the middle of a shift or the operators do not have the discipline to change them. Tampering of the dismantled filter is also difficult to prevent.

ii. Steel edge wire filters that can be washed off are also known but they are not effective in removing embedded dirt.

iii. Plate type in-line filters which can be dismantled and washed are also known. The additional weight of the in-line assembly is cumbersome and assembling and dismantling are difficult.

When a rockdrill filter clogs with dirt or malfunctions, performance is lost and typically the drill breaks down and causes an interruption in productivity.

The foregoing illustrates limitations known to exist in presently known water powered rockdrills. Thus, it is apparent that it would be advantageous to provide an alterative directed to overcoming one or more of the limitations set forth above. Accordingly, a suitable alternative is provided including features more fully disclosed hereinafter.

SUMMARY OF THE INVENTION

According to the invention there is provided a filter for a rockdrill operable by a fluid under pressure for filtering the fluid to remove solid contaminants therefrom, the filter including:
a housing;
a control element in the housing and movable relative to the housing;
the control element having a first passage providing communication between a supply inlet port in the housing at a source of fluid under pressure and a drill supply port in the housing to the drive of the rockdrill;
the control element having a second passage providing communication between the supply inlet port and a vent outlet port in the housing to the atmosphere;
a filter element on the control element interposed in the first and second passages which filters solid contaminants from a contaminated fluid passing therethrough;
the control element being positionable in a filtering mode position in which fluid under pressure flows in a first direction from the support inlet port through the filter element to the drill supply port; and
the control element being positionable in a back-flushing mode position in which the fluid under pressure flows from the supply inlet port in a reverse direction through the filter element to the vent outlet port.

The control element may include a third passage providing communication between the supply inlet port and the vent outlet port and the control element may be positionable in a rinsing mode position in which the fluid under pressure flows in the first direction from the supply inlet port to the vent outlet port through the filter element.

The first passage in the filtering mode position of the control element may also provide communication between the supply inlet port and a leg feed port in the housing to direct the fluid under pressure to a support leg of the drill to provide thrust to the support leg.

The rinsing mode position of the control element may be positioned between the filtering mode position and the back-flushing mode position.

The filter element may be fast with the control element and may move with the control element.

A releasable detent may be provided fast with the housing and may be releasably lockable to the control element in at least two positions, one position being the filtering mode position and another being the back-flushing mode position.

A sealing element may be provided on the control element to seal the vent port when the control element is in the filtering mode position.

Conveniently, a handle may be provided on the control element for moving the control element, and the control element may be rotatably movable in the housing by means of the handle.

The control element may be rotatable through 180 degrees from the filtering mode position to the back-flushing mode position.

Conveniently, the control element may be retained in the housing by means of a bearing and a seal element between the bearing and the housing.

BRIEF DESCRIPTION OF THE DRAWING FIGURES

Figure 2:
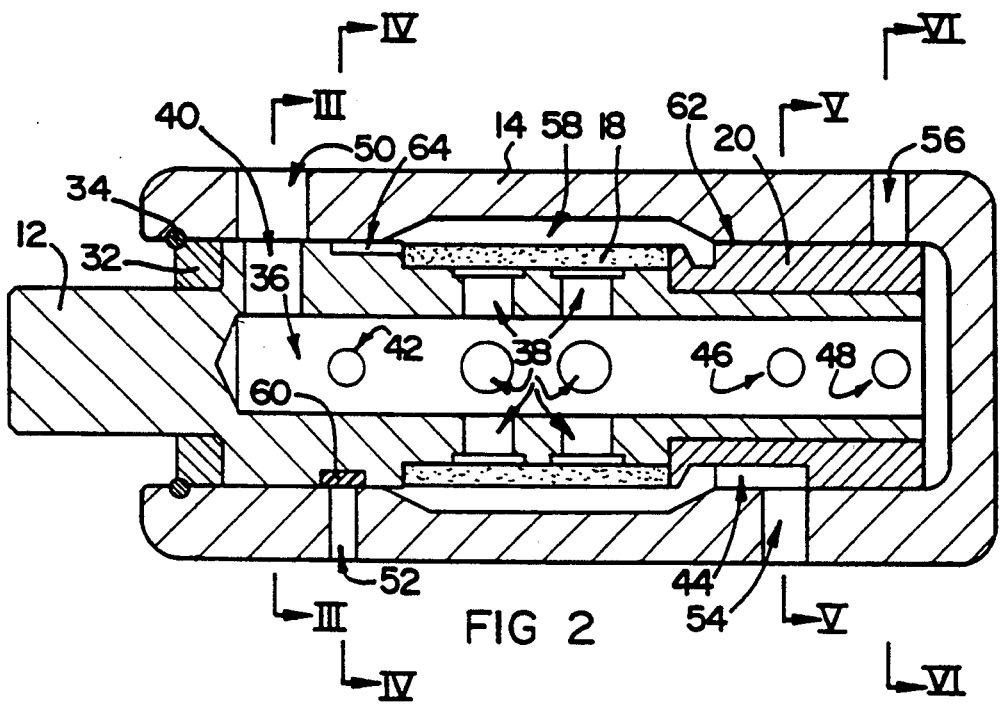
FIG. 2 is a view similar to FIG. 1 but is diagrammatic.
Figure 3A:
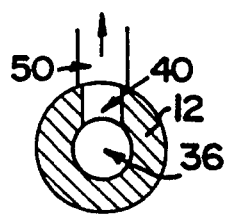
Figure 4A:
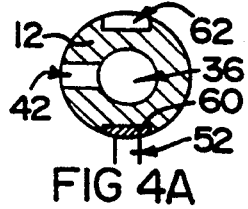
Figure 5A:
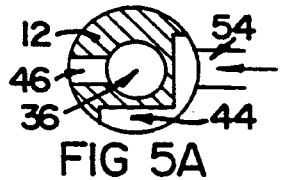
Figure 5B:
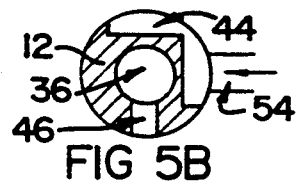
Figure 6A:
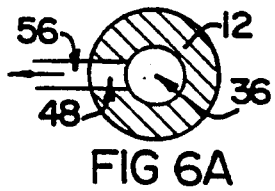
Figure 7A:

FIGS. 3A, B and C show the positions of the drill port in the drill port plane III—III in the three operating modes of the filter shown in FIG. 2;

FIGS. 4A, B and C show the positions of the vent port in the vent port plane IV—IV in the three operating modes of the filter shown in FIG. 2;

FIGS. 5A, B and C show the positions of the inlet port in the inlet port plane V—V in the three operating modes of the filter shown in FIG. 2;

FIGS. 6A, B and C show the positions of the leg port in the leg port plane VI—VI in the three operating modes of the filter shown in FIG. 2; and FIGS. 7A, B and C show the positions of the operating handle in the filtering mode, rinsing mode and back-flushing mode of operating of the filter shown in FIG. 2.

Figure 1:
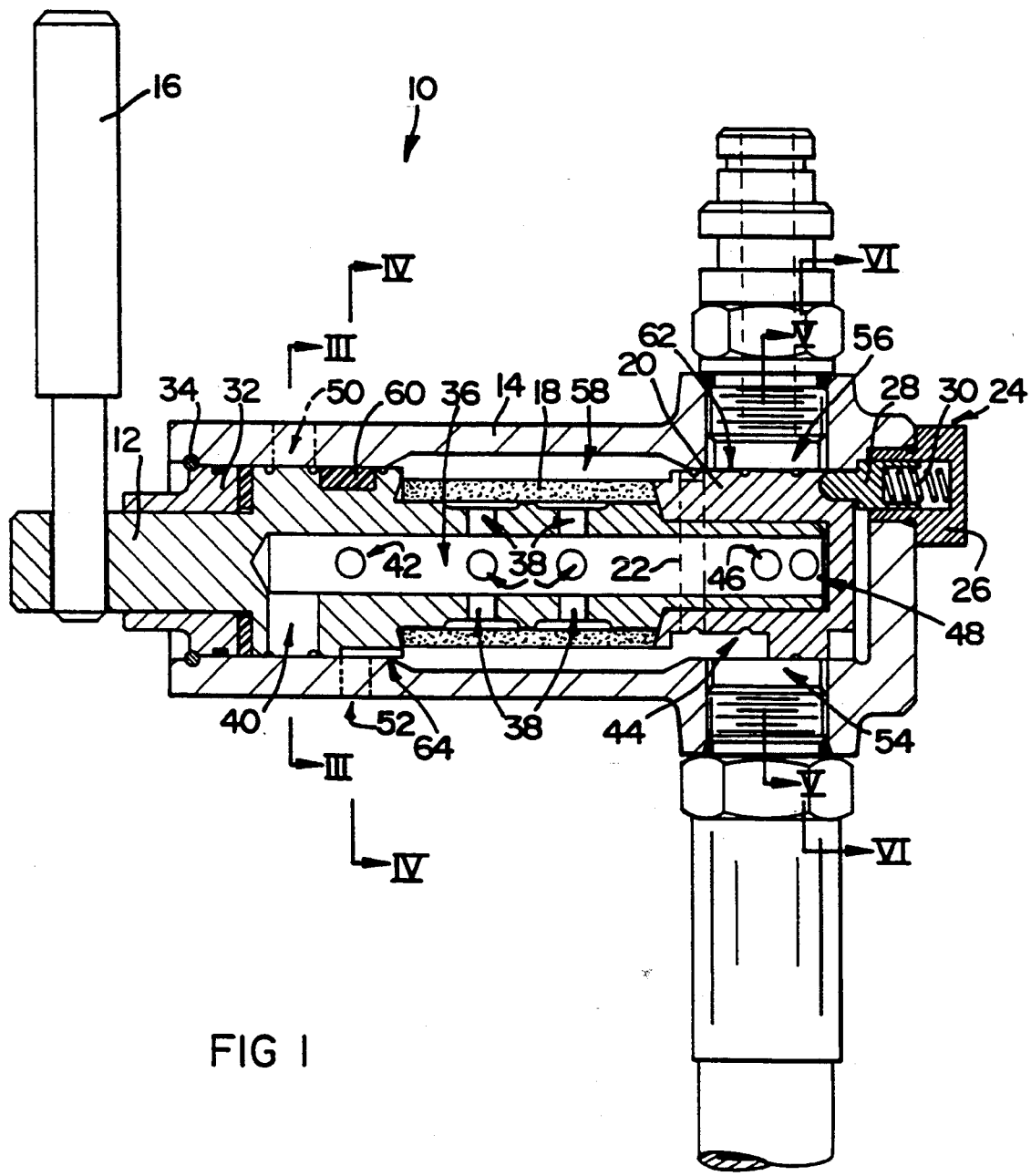
FIG. 1 is a longitudinal sectional view of a filter in accordance with the invention and shows four planes of porting function, the drill port plane being III—III, the vent port plane being IV—IV, the inlet port plane being V—V and the leg port plane being VI—VI.

Referring to FIG. 1, reference numeral 10 indicates the rockdrill filter in general. It consists of a support shaft 12 which is rotatably movable in a housing 14 forming part of the rockdrill (not shown). The shaft is rotatably movable by means of a handle 16. A filter element 18 is supported by and is axially sealed between the support shaft 12 and an inlet flange 20 which is rotationally fixed to the support shaft 12 by means of a pin 22. Thus the support shaft 12, the filter element 18 and the inlet flange 20 can rotate together as one assembly by turning the handle 16. A releasable detent 24 is provided to permit rotation of the filter 10 through 180 degrees, one extreme position being the filtering or drilling mode position, and the other extreme position being the back-flushing mode position. In between these extreme positions is the rinsing mode position. The detent 24 consists of a housing 26 in which there is slidably located a detent element 28 which is biased by means of a spring 30. The support shaft 12 is further rotationally supported in the housing 14 by means of a bearing 32 and a snap ring 34.

Referring further to FIG. 1, there is provided an axial central bore 36 in the support shaft 12 out of which lead a plurality of radial holes 38 onto the filter element 18. A number of ports further lead radially out of the central bore 36, namely a drill port 40 in the drill port plane III—III, a vent port 42 in the vent port plane IV—IV, an inlet port in a form of a slot 44 and a port 46 in the inlet port plane V—V, and a leg port 48 in the leg port plane VI—VI. There are similarly provided in the housing 14 a number of ports namely a drill supply port 50 in the drill port plane III—III, a vent outlet port 52 in the vent port plane IV—IV, a supply inlet port 54 in the inlet port plane V—V, and a leg feed port 56 in the leg port plane VI—VI. A gallery 58 is provided around the filter element 18 and can communicate with the inlet port slot 44.

The filter 10 can be operated in three modes, namely, filtering or drilling, rinsing and back-flushing. As the filter element 18 becomes clogged the handle 16 can be turned to a back-flushing mode position whereby the flow of fluid through the filter element is reversed and the flow of fluid thereby expels dirt and debris accumulated in and on the filter element to the atmosphere through the vent outlet port 52. When the handle is turned back to a filtering mode position the ports in the support shaft 12 pass through the rinsing mode which washes dirt that may have accumulated on the filter element 18 during the back-flushing mode and expels it to the atmosphere through the vent outlet port 52. When the handle 16 is positioned in the filtering mode position the filter element 18 is clean. These operations are described in greater detail below.

As indicated with reference to the drawings, four planes of porting function are identified in FIGS. 1 and 2 namely the drill port plane III—III, the vent port plane IV—IV, the inlet port plane V—V and the leg port plane VI—VI. The drill port plane controls porting to the drill supply port 50, the vent port plane controls opening and closing of the vent outlet port 52 for the rinsing and flushing of fluid which has crossed the filter element 18, the inlet port plane directs inlet fluid from the supply inlet port 54 to either the inside diameter or the outside diameter of the filter element 18, and the leg port plane controls liquid flow to the leg feed port 56 which is used to power a thrust leg for feeding a rockdrill on which the filter 10 is mounted.

Referring to FIGS. 3A, B and C through 7A, B and C, the operation of the filter 10 is described with reference to the porting locations shown in these figures. All the "A" figures show the filter 10 in a filtering or drilling mode, that is, the inlet fluid is being filtered and delivered to the rockdrill. All the "B" figures show the filter in a rinsing mode, that is, the inlet fluid is directed through the filter element 18 as if it was filtering but the fluid is directed to the atmosphere through the vent outlet port 52, and the drill supply port 50 and the leg feed port 56 are blocked. All the "C" figures show the filter in a back-flushing mode. In this mode the flow through the filter element 18 is reversed and dirt removed from the filter element is expelled to the atmosphere through the vent outlet port 52, and the drill supply port 50 and the leg feed port 56 are blocked.

FIGS. 3A, B and C show the porting arrangement through the drill support plane III—III. FIGS. 4A, B and C show the porting arrangement through the vent port plane IV—IV. FIGS. 5A, B and C show the porting arrangement through the inlet port plane V—V. FIGS. 6A, B and C show the porting arrangement through the leg port plane VI—VI. FIGS. 7A, B and C show the positions of the handle 16 in the filtering, rinsing and back-flushing modes of operation.

In the filtering mode, as shown in FIGS. 3A, 4A, 5A, 6A and 7A fluid enters the rockdrill through the supply inlet port 54 and is directed into axial slot port 44 into gallery 58 to the outside diameter of the filter element 18. The fluid then passes through the filter element 18, through the holes 38, into central bore 36, into drill port 40 on the support shaft 12, and into the drill supply port 50 in the rockdrill housing 14. Filtered fluid from the central bore 36 also passes into the leg port 48 and through the leg feed port 56 to power a thrust leg on the rockdrill. The vent outlet port 52 is blocked by a sealing element 60 on the support shaft 12 to prevent leakage to the atmosphere. The inlet port 46 is also blocked. The fluid has thus been filtered and directed to the drill supply port 50 and to the leg feed port 56.

Figure 3B:
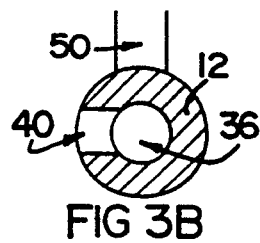
Figure 4B:
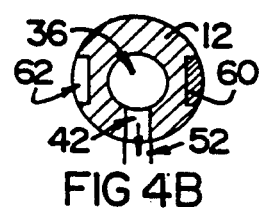
Figure 6B:
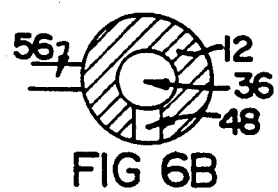
Figure 7B:

In the rinsing mode as shown in FIGS. 3B, 4B, 5B, 6B and 7B, the handle 16 is rotated through 90 degrees from the filtering mode position shown in FIG. 7A to the rinsing mode shown in FIG. 7B. While rinsing, the fluid passes into the rockdrill and through the filter element 18 in the same direction as when filtering. However, in the rinsing mode the drill supply port 50 and the leg feed port 56 are blocked as shown in FIGS. 3B and 6B. The filtered fluid from the central bore 36 is directed into the vent port 42 and to the vent outlet port 52 to the atmosphere as shown in FIG. 4B. The size of the vent outlet port 52 is appropriately sized to restrict flow and to prevent frictional loads due to pressure imbalance of the support shaft 12. Only fluid leaking past the clearance 62 can migrate into the drill supply port 50 and to the leg feed port 56. In the rinsing mode the inlet port 46 is also blocked.

Figure 3C:
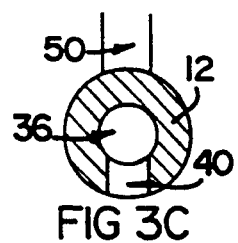
Figure 4C:
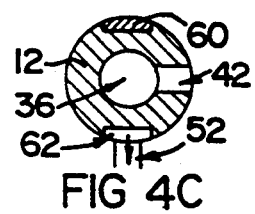
Figure 5C:
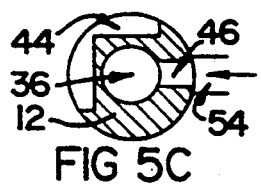
Figure 6C:
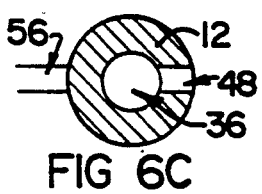
Figure 7C:

In order to engage the back-flushing mode the handle 16 is turned through another 90 degrees from the position shown in FIG. 7B to that shown in FIG. 7C. The back-flushing mode is shown by FIGS. 3C, 4C, 5C, 6C and 7C. In this mode fluid enters the rockdrill through the supply inlet port 54 but is directed immediately through the inlet port 46 into the central bore 36 as shown in FIG. 5C. The leg feed port 56 and the drill supply port 50 are blocked as shown in FIGS. 3C and 6C. Fluid in the central bore 36 passes through the holes 38 and through the filter element 18 from the inside diameter to the outside diameter of the filter element into the gallery 58. Fluid and debris in the gallery 58 are directed into a slot 64 and are expelled through the vent outlet port 52 to the atmosphere as shown in FIG. 4C. The filter element 18 has thus been cleaned. In the back-flushing mode the inlet port slot 44 is also blocked as shown in FIG. 5C and thus fluid cannot be directed to the outside diameter through the gallery 58 to the filter element 18.

When the handle 16 is turned from the back-flushing mode position shown in FIG. 7C to the filtering mode position shown in FIG. 7A, the filter 10 must pass through the rinsing mode shown by the handle position in FIG. 7B. This ensures that dirt that may have collected on the inside diameter of the filter element 18 during back-flushing will be directed to the atmosphere rather than directly into the drill supply port 50. By positioning the rinsing mode between the filtering mode and the back-flushing mode, complete cleansing of the filter 10 is ensured.

Having described the invention, what is claimed is:

1. A filter for a rockdrill operable by a fluid under pressure for filtering the fluid to remove solid contaminants therefrom, the filter including:
   a housing forming part of a rockdrill;
   a control element in the housing movable relative to the housing;
   the control element having a first passage providing communication between a supply inlet port in the housing at a source of fluid under pressure and a drill supply port in the housing, said supply port communicating with a drive element of the rockdrill;
   the control element having a second passage providing communication between the supply inlet port and vent outlet port in the housing to the atmosphere;
   a filter element on the control element interposed in the first and second passages which filters solid contaminants from a contaminated fluid passing therethrough;
   the control element being positionable in a filtering mode position in which fluid under pressure flows in a first direction from the supply inlet port through the filter element to the drill supply port; and
   the control element being positionable in back-flushing mode position in which the fluid under pressure flows from the supply inlet port in a reverse direction through the filter element to the vent outlet port.

2. A filter as claimed in claim 1, in which:
   the control element includes a third passage providing communication between the supply inlet port and the vent outlet port; and
   the control element is positionable in a rinsing mode position in which the fluid under pressure flows in the first direction from the supply inlet port to the vent outlet port through the filter element.

3. A filter as claimed in claim 2, in which:
   the rinsing mode position of the control element is positioned between the filtering mode position and the back-flushing mode position.

4. A filter as claimed in claim 1, in which:
   the first passage in the filtering mode position of the control element also provides communication between the supply inlet port and a leg feed port in the housing to direct the fluid under pressure to a support leg of the drill to provide thrust to the support leg.

5. A filter as claimed in claim 1, in which:
   the filter element is fast with the control element and moves with the control element.

6. A filter as claimed in claim 1, which includes:
   a releasable detent fast with the housing and being releasably lockable to the control element in at least two positions, one position being the filtering mode position and another being the back-flushing mode position.

7. A filter as claimed in claim 1, which includes:
   a sealing element on the control element to seal the vent outlet port when the control element is in the filtering mode position.

8. A filter as claimed in claim 1, which includes:
   a handle on the control element for moving the control element; and
   the control element is rotatably movable in the housing by means of the handle.

9. A filter as claimed in claim 8, in which:
   the control element is rotatable through 180 degrees from the filtering mode position to the back-flushing mode position.

10. A filter as claimed in claim 1, in which:
    the control element is retained in the housing by means of a bearing and a seal element between the bearing and the housing.

* * * * *